United States Patent [19]

Wilson et al.

[11] 4,239,522

[45] Dec. 16, 1980

[54] FERTILIZER SOLUTIONS CONTAINING SULFUR AND HAVING LOW CRYSTALLIZATION TEMPERATURE

[75] Inventors: Joseph F. Wilson; Lawrence M. Fodor; Joseph R. Kenton, all of Bartlesville, Okla.

[73] Assignee: Phillips Petroleum Company, Bartlesville, Okla.

[21] Appl. No.: 48,102

[22] Filed: Jun. 13, 1979

[51] Int. Cl.³ .......................... C05C 1/00; C05C 9/00; C05C 3/00

[52] U.S. Cl. .......................................... 71/29; 71/30

[58] Field of Search ...................... 71/29, 30, 64 C, 59; 260/555 S

[56] References Cited

U.S. PATENT DOCUMENTS

| | | | |
|---|---|---|---|
| 1,482,479 | 2/1924 | Kircher | 71/59 |
| 1,939,165 | 12/1933 | Eissher | 71/59 |
| 1,969,650 | 8/1934 | Klempt et al. | 71/59 |
| 2,549,430 | 4/1951 | Crittenden | 71/30 |
| 2,855,286 | 10/1958 | Harvey | 71/29 |
| 3,021,207 | 2/1962 | Stengel | 71/59 X |
| 3,029,139 | 4/1962 | Arots et al. | 71/30 |
| 3,105,754 | 10/1963 | Marx | 71/30 |
| 3,186,825 | 6/1965 | Price | 71/29 |
| 3,967,948 | 7/1976 | McCullough | 71/29 |
| 4,033,747 | 7/1977 | Young | 71/30 |
| 4,056,381 | 11/1977 | Kenton | 71/63 X |

FOREIGN PATENT DOCUMENTS 1812965  7/1970  Fed. Rep. of Germany .............. 71/30

OTHER PUBLICATIONS

Chemical Week, 2/21/79, p. 23, "Are Air pollution Rules Taking Sulfur Out of Green Plants".

NFSA Liquid Fertilizer Manual; National Fertilizer Solution Association, 910 Lehman Building, Peoria, Ill.; pp. 18–i, 18–2 (1967).

Primary Examiner—Kenneth M. Schor

[57] ABSTRACT

Stable low freeze point fertilizer solutions containing nitrogen, and sulfur are disclosed. The solutions contain specified ratios of ammonium nitrate, urea, and ammonium sulfate; such that the solutions are storage stable.

22 Claims, 2 Drawing Figures

UAN 32-AMMONIUM SULFATE-WATER SYSTEMS

SHOWING CRYSTALLIZATION ISOTHERMS AND NITROGEN:SULFUR WEIGHT RATIO DATA

UAN 32-AMMONIUM SULFATE-WATER SYSTEMS

SHOWING CRYSTALLIZATION ISOTHERMS AND
NITROGEN:SULFUR WEIGHT RATIO DATA

THE QUANTITY OF AMMONIUM SULFATE
REQUIRED TO BE ADDED TO
UAN-32 TO PRODUCE DIFFERENT N:S WT. RATIOS

FERTILIZER SOLUTIONS CONTAINING SULFUR AND HAVING LOW CRYSTALLIZATION TEMPERATURE

FIELD OF THE INVENTION

The invention pertains to nitrogen fertilizer solutions containing sulfur and exhibiting low crystallization temperatures.

BACKGROUND OF THE INVENTION

Volcanic-origin soils, such as in the Pacific Northwest, are depleted of sulfur, a secondary but essential nutrient to plants.

Standard practice for applying sulfur to such soils by users of solid fertilizers has been the application of such as prilled ammonium nitrate-ammonium sulfate solid products, or the use of ammonium sulfate as a crystalline form, or the use of such as certain commercial/fertilizer grades of monoammonium phosphate 16-20-0 ($N-P_2O_5-K_2O$) which contain low levels of gypsum as impurity.

Another solution has been the approach of suspending pulverized gypsum and/or elemental sulfur in a high nitrogen liquid fertilizer. While this sounds attractive, on a practical basis it has disadvantages in plugging spraying nozzles, and the like, or sometimes tending to either settle out or induce crystallization of the liquid fertilizer.

Liquid fertilizers compete with the solid sulfur-containing fertilizers by use of various liquid sulfur products. Ammonium polysulfide, analyzing about 20 percent nitrogen and 45 percent sulfur, is not miscible with anhydrous ammonia but is commonly coapplied with anhydrous ammonia as a soil treatment by using inconvenient dual metering and application systems. Another material commonly employed is a concentrated ammonium thiosulfate solution 12-0-0-26 (S) which is compatible with aqueous ammonia, or with another liquid fertilizer UAN-32, allowing the sulfur in this fashion to be added with the nitrogen source as a single phase liquid system. However, this is disadvantageous in that the two materials frequently must be obtained from separate suppliers, and coadmixed by the user.

Liquid fertilizers do have the inherent advantage over solid fertilizers in being particularly suited and convenient for many agricultural applications. Liquid fertilizers can be easily applied by a variety of application methods at various readily controllable strengths to either the plant or soil surface or into the soil subsurface.

Of course, to minimize shipping and handling costs, storage volumes, etc., it is important to provide as highly concentrated a liquid fertilizer as feasible. A major disadvantage, however, of liquid fertilizers is that they are temperature sensitive, that is, they begin to crystallize out of solution as the solution temperature decreases, with 32° F. (0° C.) being considered an acceptable low temperature. Crystallization causes serious problems such as plugging of lines, applicator nozzles, storage tanks, etc., as well as reducing the nutrient value of the fertilizer. Consequently, liquid fertilizers generally are limited to use when the ambient temperature is above the crystallization temperature of the fertilizer solutions.

Thus, important is the development of liquid fertilizers that contain appreciable sulfur, but which will not crystallize during cold temperatures, particularly sub-zero temperatures. Such liquid fertilizers would not plug equipment and storage tanks, and of extreme importance the liquid fertilizers could be applied to the soil during the non-growing, less productive cold season (e.g. winter), thus, reducing labor time during the valuable growing portion of the year (e.g. spring), for the same fertilizer application.

Since most liquid fertilizers employ water as the dispersion medium, the criticality becomes apparent in developing fertilizer compositions having eutectic mixtures in water that satisfy both agronomic nutrient requirements and low temperature stability prevailing in a particular geographical location.

BRIEF DESCRIPTION OF THE INVENTION

We have discovered formulations of liquid fertilizer compositions high in nitrogen and also containing appreciable and desirable amounts of sulfur, yet which exhibit surprisingly low crystallization temperatures.

Our invention comprises the formulation of liquid fertilizer compositions having about a 1.5:1 to 25:1 weight ratio of nitrogen:sulfur (each expressed as the element N:S), which liquid fertilizer solutions have crystallization temperatures below about 32° F. (0° C.), feasibly even below about 0° F. (−17.8° C.), and even very effectively and usefully below about −20° F. (−28.9° C.), a major achievement in the solution fertilizer arts. These formulations contain ammonium nitrate, urea, ammonium sulfate, and water.

Figure 1:
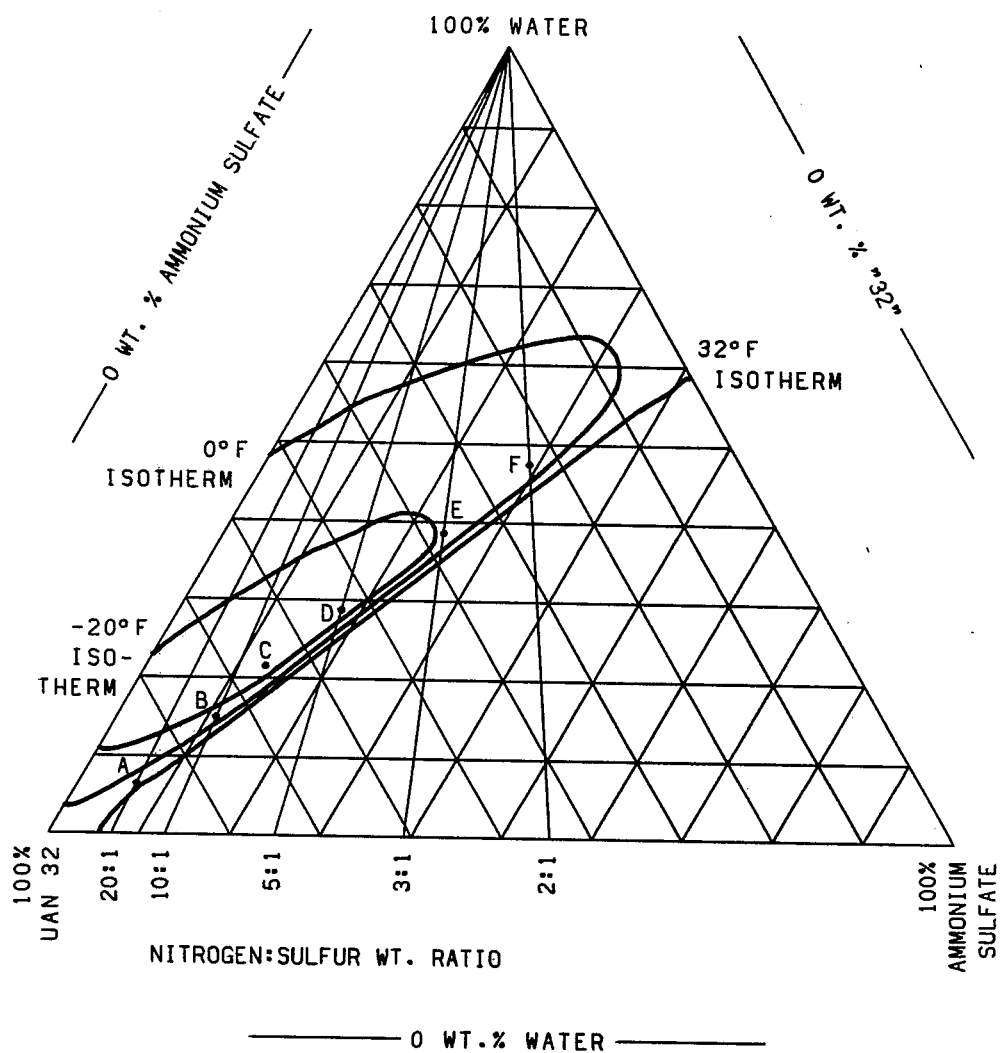
FIG. 1 is a trilinear graph plotting UAN-32 versus water versus ammonium sulfate in the formulations, with those compositions inside of the −20° F. isotherm, 0° F. isotherm, and to the left or above the 32° F. isotherm, representing those solutions which were stable and substantially solids-free at the indicated relationships and temperatures. The UAN-32 contains about 32 weight percent nitrogen as N, and is a solution of ammonium nitrate, urea, and a sufficient amount of water to form a single component.

The alphabetical designations given on the graph of FIG. 1 are approximate minimum values for some compositions in accordance with our invention. These compositions are described in more detail hereinafter in Example I.

Figure 2:
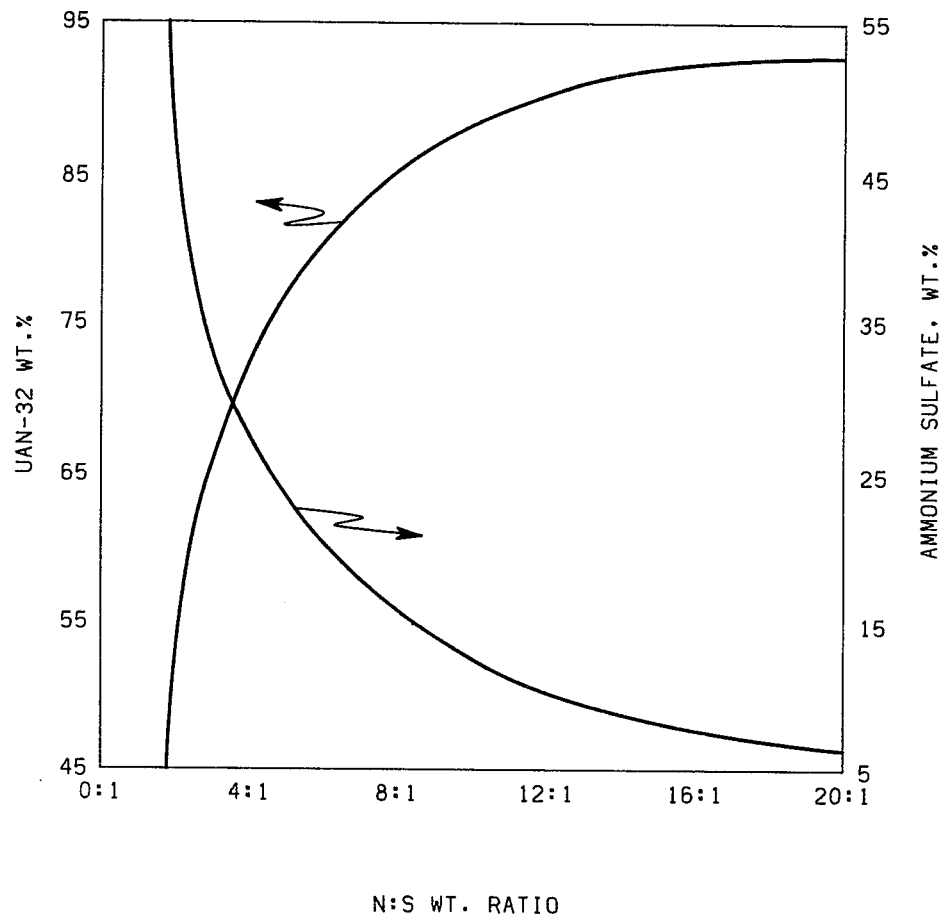

FIG. 2 shows the amount of UAN-32 in weight percent plus the amount of ammonium sulfate weight percent to combine to make 100 percent of any broad range of N:S (as the element) weight ratio. This graph shows the quantity of ammonium sulfate required to be added to UAN-32 to produce various N:S weight ratios as shown. For example, to obtain an N:S weight ratio of 8:1, find "8:1" at the bottom of the graph, and read directly up to show a requirement of about 15 weight percent ammonium sulfate plus 85 weight percent UAN-32 solution to obtain a resulting solution with an N:S weight ratio of about 8:1.

DETAILED DESCRIPTION OF THE INVENTION

Our invention provides formulations of liquid fertilizer compositions having about a 1.5:1 to 25:1 weight ratio of N:S, and which exhibit crystallization temperatures below about 32° F. (0° C.). Our formulations contain four basic ingredients, ammonium nitrate, urea, ammonium sulfate, and water.

For convenience in formulation and in accordance with our trilinear graph to avoid the complexities of an additional component in trying to produce a pictorial two-dimensional representation, the ammonium nitrate, urea, and a portion of the water are shown as a single component UAN-32. The UAN-32 plus ammonium sulfate and further water are combined in suitable amounts in accordance with our discovery to provide a liquid fertilizer solution containing appreciable desirable sulfur yet having crystallization points below about 32° F. (0° C.).

UAN is a combination of ammonium nitrate, urea, and water, containing approximately 32 weight percent nitrogen. Usually, the ratio is about 1:1.29 urea:ammonium nitrate to 1:1.39. The N, of course, is present in one or more combined forms from the components making up the UAN-32. The term "UAN-32" is one recognized in the fertilizer industry, with the material available from a number of sources. Thus, a "UAN-32" fertilizer solution would be expressed as 32-0-0 in the fertilizer trade, indicating 32 weight percent N as the element, 0 phosphorus expressed as $P_2O_5$, and 0 potash expressed as $K_2O$. UAN may be made up to slightly lesser strengths for particular users, such as "UAN-28", a 28-0-0 fertilizer solution. The term "urea-ammonium nitrate liquid solution" also is commonly employed, and is the derivation of the "UAN" employed for shorthand.

The individual ingredients of a typical UAN-32 are shown in the table below:

TABLE I

UAN-32 Composition[a]

| Component | Conc., Wt. % | Nitrogen Content Wt. % |
|---|---|---|
| Urea (46.67% N) | 33.6 | 15.68 |
| Ammonium Nitrate (35.00% N) | 46.7 | 16.35 |
| Water | 19.7 | |
| | 100.0 | 32.03 |

[a]Also generally contains about 150 parts per million $CrO_4$ ion or 1000 ppm $PO_4$ ion as a corrosion inhibitor, and 0 to 0.05 weight percent free $NH_3$ (residual from urea manufacture).

Any ammonium sulfate can be utilized. Ammonium sulfates are brownish-gray to white crystalline materials, depending on degree of purity. Commercial fertilizer or nonfertilizer grades containing 90 to 100 weight percent ammonium sulfate $(NH_4)_2SO_4$ are suitable.

Our invention, however, is not limited to the use of a "UAN" as a source of N, or ammonium sulfate as the source of S, but can use equivalent components such as ammonia, ammonium hydroxide, aqueous nitric acid, sulfuric acid, etc., so long as the resulting solutions are within the scope of our low crystallization-temperature sulfur-containing, high-nitrogen, fertilizer solutions.

MIXING

Suitable amounts of the desired ingredients can be mixed in any convenient mixing container and in any order. Sometimes, when particular ingredients are used heating or cooling is necessary to complete mixing. Acidic components may require special resistant-metal mixers and tanks.

For these reasons, it becomes quicker and simpler to employ UAN-32 which is available commercially and has already taken into account some of the heat balance otherwise involved in starting with the other raw chemicals otherwise useful in our invention merely through its initial preparation. Therefore, our invention becomes simplified by adding solid ammonium sulfate to liquid UAN-32 to the desired N:S ratio and adding water to the desired crystallization temperature (FIG. 1). The quantity of ammonium sulfate required to be added to UAN-32 relative to a specific N:S weight ratio as desired is readily determined in accordance with FIG. 2 hereinbefore described.

UAN-32 containing up to 6 weight percent sulfur (expressed as sulfur) (the sulfur was derived from ammonium sulfate) meets requirements of a sulfur-containing fertilizer for use in the U.S. Northwest. Upward adjustment of the pH with ammonia or ammonium hydroxide to 7.8 or above in products containing up to about 3 weight percent sulfur substantially avoids potential corrosion of iron. For higher S levels, the addition of small amounts of at least one of chromate or dichromate or phosphate in addition to the aforesaid pH adjustment substantially eliminates corrosion for the products containing 3 to 6 weight percent sulfur.

The chromate inhibitor can be added by such as potassium or sodium chromate or dichromate, to provide such as about 500 to 1500 ppm, 0.05 to 0.15 weight percent, as $Cr_2O_7$. Suitable phosphates include such as 10-34-0, ammonium hydrogen or dihydrogen phosphate, and can be added to produce a product containing about 500 to 1500 ppm, 0.05 to 0.15 weight percent, as $PO_4$.

EXAMPLES

Examples provided are intended to be of assistance to one skilled in the art in the further understanding of our invention. The examples provided, particular components employed, ratios, relationships, conditions, and the like, are intended to be exemplary of the invention, and not limitative of reasonable scope of the disclosure which incorporates not only these examples, but the descriptive portions of the specification, and our claims.

EXAMPLE I

Method of Calculating Typical Fertilizer Grades

Most commercial fertilizers are referred to or identified in accordance with the pounds or weight percent of each nutrient present and are always listed in the order of nitrogen (N)—phosphorous (as $P_2O_5$)—potassium (as $K_2O$). Additional nutrients or trace elements are listed next accompanied by the element symbol. Thus, the nutrient analysis of a typical fertilizer composition described in this invention can be calculated in the following manner.

| | | Analysis of Individual Components | |
|---|---|---|---|
| | | Wt. % N | Wt. % S |
| Composition = | 64.6 Wt. % UAN-32 | 32.03[a] | — |
| | 14.0 Wt. % $(NH_4)_2SO_4$ | 21.2 | 24.26 |
| | 21.4 Wt. % $H_2O$ | — | — |
| | 100.0 | | |

Based on 100 pounds (lbs.) of fertilizer composition:

| | | Wt. % or Pounds (lbs.) | |
|---|---|---|---|
| | | N | S |
| UAN-32 | 64.6 lbs. × 32.03% = | 20.69 | — |
| $(NH_4)_2SO_4$ | 14.0 lbs. × 21.20% = | 2.97 | — |
| $(NH_4)_2SO_4$ | 14.0 lbs. × 24.26% = | — | 3.39 |
| | Total = | 23.66 | 3.39 |

[a]Refer TABLE I.

Thus, the final fertilizer composition is identified as 23.66-0-0-3.39(S).

EXAMPLE II

The graph in FIG. 1 enables a person skilled in the art to formulate fertilizer solutions having a N:S weight ratio of about 1.5:1 to about 25:1 by varying the amounts of UAN-32, ammonium sulfate, and water. Likewise, formulations having crystallization temperatures below 0° F. (−17.8° C.) can be produced by selecting points within the 0° F. (−17.8° C.) isotherm portion of the graph in FIG. 1. Likewise, formulations having crystallization temperatures below −20° F. (−28.9° C.) can be produced by selecting points within the −20° F. (−28.9° C.) isotherm portion of the graph in FIG. 1. Thus, FIG. 1 serves to establish the approximate limits for each component of the current invention relative to the desired crystallization temperature. The alphabetical designation given on the graph are the approximate minimum values for some desired compositions. Compositions above the 32° F. (0° C.) isotherm line do not crystallize at 32° F. (0° C.) whereas compositions below the isothermal line crystallize. The analysis and crystallization temperatures of the selected formulations designated by letters A through F are also shown in Table II and help to further establish ranges for the ingredients used.

solution still contains solids, water is added until the solids disappear, and the composition calculated accordingly.

The crystallization points or crystallization temperatures disclosed in our examples are determined by slowly cooling the liquid fertilizer solution until crystals form.

A 15 milliliter fertilizer sample was charged to a vacuum-jacketed glass receiver, 200 mm×41 mm O.D. (22 mm I.D.) which was fitted with a thermometer, a 16 gauge stainless steel wire stirrer 300 mm long and spiraled 18 mm on one end, a cork adapted with openings for the thermometer and stirrer, and a heating wire on the outside of the lower 10.16 centimeters. The receiver containing the fertilizer sample was placed in a 1-pint size Dewar flask and the stirrer started. The Dewar flask was charged about one-fourth full with liquid nitrogen. The receiver-sample penetrated the nitrogen only about 2 centimeters. The receiver-sample was adjusted so that the cooling rate was about 1° to 2° F. (0.6°–1.1° C.) per minute. Cooling and stirring was continued until crystals are formed. The temperature at this point is called the crystallization or freezing temperature. The sample can, if desired, be warmed up by means of the heating wire at about 1° to 2° F. (0.6°–1.1° C.) per minute until the crystals dissolve. This point is called the re-melt temperature. Our invention is based on the use of crystallization temperatures.

TABLE II

Analysis and Crystallization Temperatures of A through F Formulations

| No. | NiS Wt. Ratio | Grade | Crystallization Temp., °F. | Formulation, wt. % UAN-32 | (NH$_4$)$_2$SO$_4$ | H$_2$O |
|---|---|---|---|---|---|---|
| A | 20:1 | 29.1-0-0-1.45(S) | <32 | 87.0 | 6.0 | 7.0 |
| B | 10:1 | 26.3-0-0-2.66(S) | <0 | 75.0 | 11.0 | 14.0 |
| C | 7:1 | 23.6-0-0-3.39(S) | 0−−20 | 64.6 | 14.0 | 21.4 |
| D | 5:1 | 21.3-0-0-4.21(S) | −20 | 55.4 | 17.6 | 27.0 |
| E | 3:1 | 17.1-0-0-5.69(S) | <0 | 38.0 | 23.5 | 38.5 |
| F | 2:1 | 13.6-0-0-6.90(S) | <0 | 23.5 | 28.5 | 48.0 |

EXAMPLE III

This example describes the preparation of a typical liquid fertilizer composition. To a glass oil sampling bottle (150 mm×30 mm) having a volume capacity of 115 milliliters was added 64.6 grams of UAN-32, 14.0 grams of (NH$_4$)$_2$SO$_4$ and 21.4 grams of deionized water. The bottle, about 60 percent liquid full, was closed with a rubber stopper and mechanically shaken at ambient room temperature for 15 minutes whereupon a clear solid-free solution was obtained. The crystallization temperature was then measured. Occasionally, samples of different compositions do not form solid-free solutions at room temperature. In these cases such a sample is gently heated in a warm (66° C.) water bath for an additional 15 minutes with intermittent shaking. If the

EXAMPLE IV

Preparation of a Trilinear Graph Showing One-Phase Areas In The System UAN-32 (Ammonium Nitrate Plus Water Plus Urea):Ammonium Sulfate:Water Table III lists the composition and crystallization temperature for UAN-32/ammonium sulfate liquid fertilizer prepared and tested according to Examples I and II. The table also lists the ingredients on a dry weight basis which implies that the composition can be mixed initially from dry ingredients rather than from a liquid ingredient such as UAN-32. Numbers 5–14 are listed to demonstrate crystallization points without the presence of ammonium sulfate.

TABLE III

Formulations and Properties Of UAN-32 - Ammonium Sulfate Liquid Fertilizer

| No. | Formulation Wt. % UAN-32 | AS[1] | H$_2$O | Dry Wt. Basis, % AN[2] | UREA | AS | H$_2$O | Crystallization T, F | C | N-P-K-S Ratio Grade | N:S Wt Ratio |
|---|---|---|---|---|---|---|---|---|---|---|---|
| 1 | 96.0 | 4.0 | 0 | 44.8 | 32.3 | 4.0 | 18.9 | 22 | 5.6 | 31.57-0-0-1.31(S) | 24.1:1 |
| 2 | 95.0 | 5.0 | 0 | 44.4 | 31.9 | 5.0 | 18.7 | 20 | 6.7 | 31.46-0-0-1.63(S) | 19.3:1 |
| 3 | 94.0 | 6.0 | 0 | 43.9 | 31.6 | 6.0 | 18.5 | 70 | 21 | 31.35-0-0-1.96(S) | 16.0:1 |
| 4 | 80.0 | 20.0 | 0 | 37.4 | 26.9 | 20.0 | 15.7 | >70 | >21 | 29.84-0-0-4.85(S) | 6.15:1 |
| 5 | 97.1 | 0 | 2.9 | 45.3 | 32.6 | 0 | 22.1 | 3 | −16.1 | 31.07-0-0-0(S) | — |
| 6 | 94.3 | 0 | 5.7 | 44.0 | 31.7 | 0 | 24.3 | −5 | −20.6 | 30.18-0-0-0(S) | — |
| 7 | 91.6 | 0 | 8.4 | 42.8 | 30.8 | 0 | 26.4 | −12 | −24.4 | 29.31-0-0-0(S) | — |
| 8 | 89.2 | 0 | 10.8 | 41.6 | 30.0 | 0 | 28.4 | −20 | −28.9 | 28.54-0-0-0(S) | — |

TABLE III-continued

Formulations and Properties Of UAN-32 - Ammonium Sulfate Liquid Fertilizer

| | Formulation | | | | | | Crystallization | | N-P-K-S | |
|---|---|---|---|---|---|---|---|---|---|---|
| | Wt. % | | | Dry Wt. Basis, % | | | T, | | Ratio | N:S Wt |
| No. | UAN-32 | AS[1] | $H_2O$ | AN[2] | UREA | AS | $H_2O$ | F | C | Grade | Ratio |
| 9 | 86.8 | 0 | 13.2 | 40.5 | 29.2 | 0 | 30.3 | −18 | −27.8 | 27.78-0-0-0(S) | — |
| 10 | 70.0 | 0 | 30.0 | 32.7 | 23.5 | 0 | 43.8 | −19 | −28.2 | 22.40-0-0-0(S) | — |
| 11 | 50.0 | 0 | 50.0 | 23.4 | 16.8 | 0 | 59.8 | 2 | −16.7 | 16.00-0-0-0(S) | — |
| 12 | 30.0 | 0 | 70.0 | 14.0 | 10.1 | 0 | 75.9 | 8 | −13.3 | 9.60-0-0-0(S) | — |
| 13 | 20.0 | 0 | 80.0 | 9.3 | 6.7 | 0 | 84.0 | 6 | −14.4 | 6.40-0-0-0(S) | — |
| 14 | 60.0 | 0 | 40.0 | 28.0 | 20.2 | 0 | 51.8 | −5 | −20.6 | 19.20-0-0-0(S) | — |
| 15 | 0 | 30.0 | 70.0 | 0 | 0 | 30.0 | 70.0 | 7 | −13.9 | 6.36-0-0-7.27(S) | 0.9:1 |
| 16 | 0 | 20.0 | 80.0 | 0 | 0 | 20.0 | 80.0 | 12 | −11.1 | 4.24-0-0-4.85(S) | 0.9:1 |
| 17 | 10.0 | 10.0 | 80.0 | 4.6 | 3.4 | 10.0 | 82.0 | 16 | −8.9 | 5.32-0-0-2.42(S) | 2.2:1 |
| 18 | 10.0 | 30.0 | 60.0 | 4.6 | 3.4 | 30.0 | 62.0 | −2 | −18.9 | 9.56-0-0-7.27(S) | 1.3:1 |
| 19 | 18.2 | 36.4 | 45.4 | 8.5 | 6.1 | 36.4 | 49.0 | 42 | 5.6 | 13.52-0-0-8.82(S) | 1.5:1 |
| 20 | 20.0 | 30.0 | 50.0 | 9.3 | 6.7 | 30.0 | 54.0 | −12 | −24.4 | 12.76-0-0-7.27(S) | 1.8:1 |
| 21 | 29.7 | 29.7 | 40.6 | 13.9 | 10.0 | 29.7 | 46.4 | 45 | 7.2 | 15.80-0-0-7.20(S) | 2.2:1 |
| 22 | 30.0 | 20.0 | 50.0 | 14.0 | 10.1 | 20.0 | 55.9 | −4 | −20.0 | 13.84-0-0-4.85(S) | 2.9:1 |
| 23 | 34.0 | 24.0 | 42.0 | 15.9 | 11.4 | 24.0 | 48.7 | −17 | −27.2 | 15.99-0-0-8.82(S) | 2.7:1 |
| 24 | 35.7 | 26.7 | 37.6 | 16.7 | 12.0 | 26.7 | 44.6 | 58 | 14.4 | 17.06-0-0-6.47(S) | 2.6:1 |
| 25 | 40.0 | 10.0 | 50.0 | 18.7 | 13.4 | 10.0 | 57.9 | −5 | −20.6 | 14.92-0-0-2.42(S) | 6.2:1 |
| 26 | 40.0 | 20.0 | 40.0 | 18.7 | 13.4 | 20.0 | 47.9 | −20 | −28.9 | 17.04-0-0-4.85(S) | 3.5:1 |
| 27 | 40.0 | 25.0 | 35.0 | 18.7 | 13.4 | 25.0 | 42.9 | >70 | >21 | 18.10-0-0-6.06(S) | 3.0:1 |
| 28 | 48.0 | 12.5 | 39.5 | 22.4 | 16.1 | 12.5 | 49.0 | −11 | −23.9 | 18.05-0-0-3.03(S) | 6.0:1 |
| 29 | 48.2 | 21.8 | 30.0 | 22.5 | 16.2 | 21.8 | 39.5 | >70 | >21 | 20.02-0-0-5.28(S) | 3.8:1 |
| 30 | 50.0 | 20.0 | 30.0 | 23.4 | 16.8 | 20.0 | 39.8 | −27 | −32.7 | 20.24-0-0-4.85(S) | 4.2:1 |
| 31 | 51.6 | 16.7 | 31.7 | 24.1 | 17.3 | 16.7 | 41.9 | <−22 | <−30 | 20.04-0-0-4.05(S) | 4.9:1 |
| 32 | 55.0 | 18.3 | 26.7 | 25.7 | 18.5 | 18.3 | 37.5 | −13 | −25.0 | 21.48-0-0-4.44(S) | 4.8:1 |
| 33 | 59.4 | 16.8 | 23.8 | 27.7 | 20.0 | 16.8 | 35.5 | −22 | −30.0 | 22.56-0-0-4.07(S) | 5.5:1 |
| 34 | 60.0 | 20.0 | 20.0 | 28.0 | 20.2 | 20.0 | 31.8 | >70 | >21 | 23.44-0-0-4.85(S) | 4.8:1 |
| 35 | 60.0 | 10.0 | 30.0 | 28.0 | 20.2 | 10.0 | 41.8 | −24 | −31.1 | 21.32-0-0-2.42(S) | 8.8:1 |
| 36 | 62.1 | 15.5 | 22.4 | 29.0 | 20.9 | 15.5 | 34.6 | −22 | −30.0 | 23.19-0-0-1.76 S) | 6.2:1 |
| 37 | 67.3 | 13.5 | 19.2 | 31.4 | 22.6 | 13.5 | 32.5 | −8 | −22.2 | 24.36-0-0-3.27(S) | 7.4:1 |
| 38 | 70.0 | 10.0 | 20.0 | 32.7 | 23.5 | 10.0 | 33.8 | −19 | −28.2 | 24.52-0-0-2.42(S) | 10.1:1 |
| 39 | 70.0 | 20.1 | 10.0 | 32.7 | 23.5 | 20.1 | 23.7 | >70 | >21 | 26.64-0-0-4.87(S) | 5.5:1 |
| 40 | 74.1 | 12.1 | 13.8 | 34.6 | 24.9 | 12.1 | 28.4 | −12 | −24.4 | 26.27-0-0-2.93(S) | 9.0:1 |
| 41 | 80.0 | 6.0 | 14.0 | 37.4 | 26.9 | 6.0 | 29.7 | −12 | −24.4 | 26.87-0-0-1.45(S) | 18.5:1 |
| 42 | 87.1 | 7.9 | 5.0 | 40.7 | 29.3 | 7.9 | 22.1 | −1 | −18.3 | 29.58-0-0-1.91(S) | 15.5:1 |
| 43 | 90.0 | 5.0 | 5.0 | 42.1 | 30.2 | 5.0 | 22.7 | 7 | 13.9 | 29.86-0-0-1.21(S) | 24.7:1 |

[1]Ammonium sulfate, dry basis: 21.2 wt. % N, 24.2% S.
[2]Ammonium nitrate.

When the data listed in Table III are plotted on a trilinear graph such as FIG. 1, there is seen definite zones wherein the different fertilizer compositions have widely distributed crystallization temperatures. Through the use of the trilinear graph of FIG. 1, it is possible to select a high nitrogen-high sulfur liquid fertilizer containing a minimum amount of water which will have a crystallization temperature satisfactory for prevailing weather conditions, one that can be independent of the time of the year or season.

The disclosure, including data, has illustrated the value and effectiveness of our invention. The examples, the knowledge and background of the field of the invention and of general principles of chemistry and other applicable sciences including the fertilizer arts have formed the bases from which the broad descriptions of our invention including the ranges of conditions and generic groups of operant components have been developed, and formed the bases for our claims here appended.

We claim:

1. A substantially stable nitrogen sulfur aqueous liquid fertilizer solution prepared by a process which comprises admixing water, ammonium nitrate, urea, and ammonium sulfate, in proportions sufficient to establish a composition in the range of about 1.5:1 to 25:1 weight ratio N:S and exhibiting a crystallization temperature below about 32° F.

2. The stabilized nitrogen sulfur liquid fertilizer solution as defined by the parameters (a) to the left of the 32° F. isotherm of FIG. (1), (b) a composition within the range of about 1.5:1 to 25:1 N:S, and (c) exhibiting a crystallization temperature below about 32° F.

3. The stabilized nitrogen sulfur liquid fertilizer solution as defined by the parameters (a) within the 0° F. isotherm of FIG. (1), (b) a composition within the range of about 1.5:1 to 25:1 N:S, and (c) exhibiting a crystallization temperature below about 0° F.

4. The stabilized nitrogen sulfur liquid fertilizer solution as defined by the parameters (a) within the −20° F. isotherm of FIG. (1), a composition within the range of about 1.5 to 25:1 N:S, and (c) exhibiting a crystallization temperature of below about −20° F.

5. The nitrogen sulfur fertilizer solution according to claim 1 wherein said ammonium nitrate, urea, and a portion of said water are employed in the form of UAN 28-32 containing N in the ratio of about 28 to 32 weight percent.

6. The nitrogen sulfur fertilizer solution according to claim 5 wherein said sulfur is present to the extent of up to about 3 weight percent S, and wherein said sulfur containing nitrogen liquid fertilizer solution further has been treated with ammonia or ammonium hydroxide sufficient to adjust the pH of the resulting treated product to at least about 7.8.

7. The nitrogen sulfur fertilizer solution according to claim 5 wherein said S is present to the extent of about 3 to 6 weight percent S, and further containing a minor amount of chromate, dichromate, or phosphate ion sufficient to substantially eliminate ferrous corrosion.

8. A substantially stable nitrogen sulfur aqueous liquid fertilizer solution prepared by a process which comprises admixing water, ammonium nitrate, urea, and ammonium sulfate, employing proportions sufficient to establish a composition of about 1.5:1 to 25:1 weight ratio of N:S and exhibiting a crystallization temperature below about 32° F., and further defined by the compositional area to the left of the 32° F. isotherm of FIG. (1); wherein said ammonium nitrate can be supplied by nitric acid and ammonia or ammonium hydroxide, and said ammonium sulfate by sulfuric acid and ammonia or ammonium hydroxide.

9. The stabilized nitrogen sulfur liquid fertilizer solution of claim 8 as defined by the compositional area within the 0° F. isotherm of FIG. (1) and within the range of 2:1 to 20:1 N:S.

10. The stabilized nitrogen sulfur liquid fertilizer solution of claim 9 as defined by the compositional area within the −20° F. isotherm of FIG. (1) and within the range of 3:1 to 20:1 N:S.

11. The solution according to claim 8 employing said components ammonium nitrate, urea, and a portion of said water, in the form of UAN containing N in the ratio of about 28 to 32 weight percent.

12. The solution according to claim 11 further characterized by a pH of at least about 7.8.

13. The solution according to claim 12 further containing a minor amount of at least one of chromate, dichromate or phosphate sufficient to substantially eliminate ferrous corrosion.

14. The solution according to claim 13 containing 500 to 1500 ppm chromate or dichromate, or phosphate, or both phosphate and one or both of chromate and dichromate.

15. The stable nitrogen sulfur liquid fertilizer solution of claim 1 exhibiting a crystallization temperature below about 0° F.

16. The stable nitrogen sulfur liquid fertilizer solution of claim 1 exhibiting a crystallization temperature below about −20° F.

17. The solution according to claim 11 containing a formulation of 87 weight percent UAN-32, 6 weight percent ammonium sulfate, and 7 weight percent water, and exhibiting a crystallization temperature of less than 32° F.

18. The solution according to claim 11 containing a formulation of 75 weight percent UAN-32, 11 weight percent ammonium sulfate, and 14 weight percent water, and exhibiting a crystallization temperature of less than 0° F.

19. The solution according to claim 11 containing a formulation of 64.6 weight percent UAN-32, 14 weight percent ammonium sulfate, and 21.4 weight percent water, and exhibiting a crystallization temperature of less than −20° F.

20. The solution according to claim 11 containing a formulation of 55.4 weight percent UAN-32, 17.6 weight percent ammonium sulfate, and 27.0 weight percent water, and exhibiting a crystallization temperature of less than −20° F.

21. The solution according to claim 11 containing a formulation of 38.0 weight percent UAN-32, 23.5 weight percent ammonium sulfate, and 38.5 weight percent water, and exhibiting a crystallization temperature of less than 0° F.

22. The solution according to claim 11 containing a formulation of 23.5 weight percent UAN-32, 28.5 weight percent ammonium sulfate, and 48.0 weight percent water, and exhibiting a crystallization temperature of less than 0° F.

* * * * *